Aug. 14, 1956        R. A. KENNEDY        2,759,176
BATTERY CURRENT LEAK INDICATOR
Filed March 24, 1953
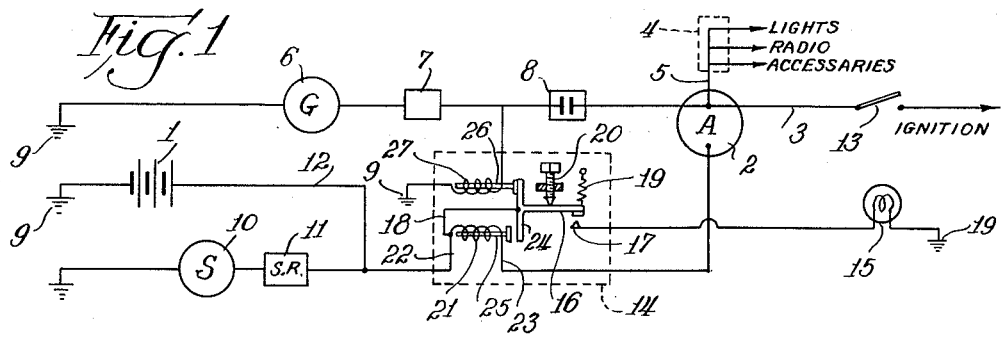
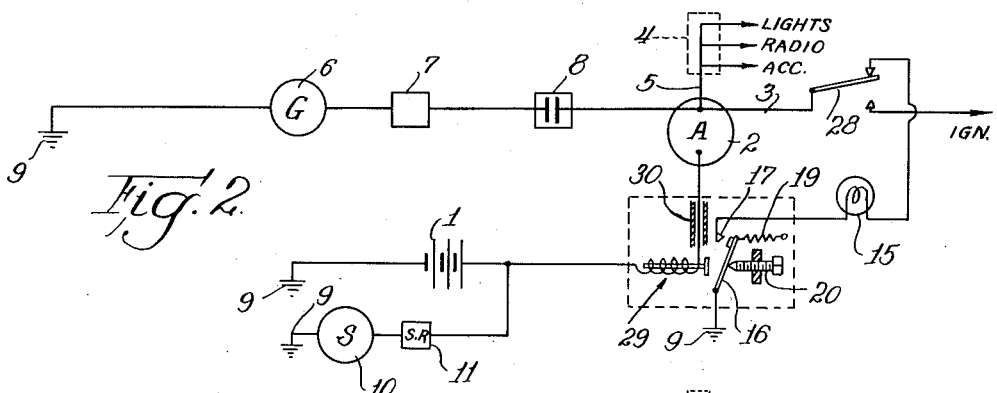
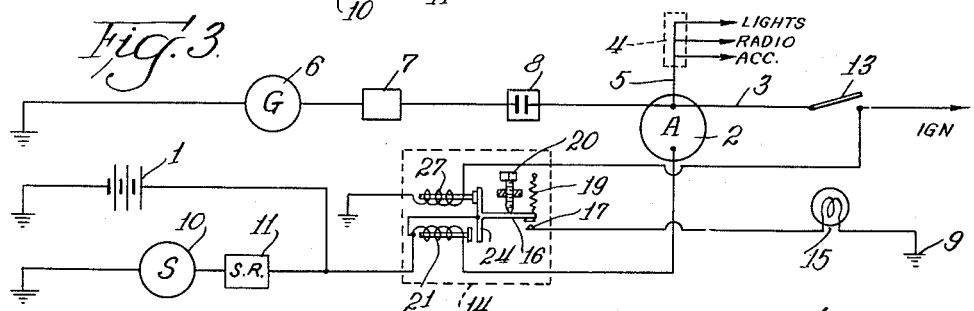
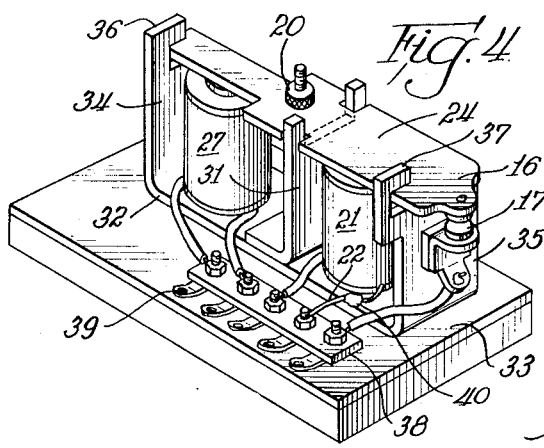
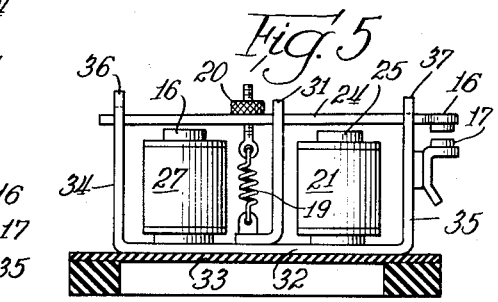
INVENTOR.
Roger A. Kennedy
BY
Watson D. Harbaugh
Atty.

United States Patent Office 2,759,176
Patented Aug. 14, 1956

2,759,176

BATTERY CURRENT LEAK INDICATOR

Roger A. Kennedy, Chicago, Ill.

Application March 24, 1953, Serial No. 344,381

10 Claims. (Cl. 340—248)

This invention relates to electric current leak indicating devices and particularly to such means for indicating current drain in battery powered electrical systems which are coupled with a second electric power source that normally relieves the battery of its load. An example of such an electrical system is that of vehicle driven by an internal combustion engine wherein power for starting and ignition of the engine, and for energization of numerous other load components, is supplied by the battery and wherein a generator driven by the engine normally supplants the battery as an electric power source.

In such systems it is often desirable to have a prominent and specific signal means, other than the usual ammeter, to determine whether the generator is carrying the load or whether there is a current drain on the battery; and also to indicate the existence of any current drain on the battery when the generator is not in normal operation. It is therefore the primary object of this invention to provide such a signal means.

Other main objects of this invention are to provide a simple signal means which will indicate a battery current drain even though such drain may be too small to give a discharge indication on the usual ammeter; to provide such a means which is wholly automatic in operation and which will function to signal only when the generator is supplying less power than that required by the load; to provide a battery powered and actuated signal means which will be automatically inactivated by generator power equal to or greater than the load requirement; to provide such a means which can readily be included in any battery powered electrical system having a secondary power source; and to provide a simple automatic signal device which can easily be installed in any existing battery powered electrical system without change or alteration of the circuits thereof.

A specific embodiment of this invention is shown in the accompanying drawings in which:

Figure 1 is a diagrammatic view showing the circuit arrangement of an electrical system for a motor vehicle, which circuit includes the improved battery drain signal means.

Fig. 2 is a similar view of a motor vehicle circuit arrangement having a modified form of the signal means which is operable only when the engine ignition switch is in off position.

Fig. 3 is a view similar to Fig. 1 but showing a slightly modified arrangement of the signal inactivating circuit.

Fig. 4 is a perspective view of a signal operating device or relay of the type which may be used with the circuit arrangements of Figs. 1 and 3, and Fig. 5 is a sectional elevational view of the device shown in Fig. 4.

In the form shown in Fig. 1, the invention is applied to a typical battery power electrical system as may be used in a motor vehicle operated by an internal combustion engine, and in which the electrical system is arranged to supply power for starting and ignition for the internal combustion engine as well as for the other load components which require electrical power. Such a system also includes a generator driven by the engine and connected to supplant the battery as a power source when the generator is being driven by the engine at a speed sufficient to carry the electrical load.

Such a typical battery powered electrical system, as shown, comprises a battery 1 having its positive side connected directly to a common junction means 2, which may be in the form of an ammeter. The ignition system for the internal combustion engine is connected to the junction means 2 by a lead 3 and the various other load components, such as the lights, radio and accessories, which are indicated generally by the dotted outline 4, are also connected to the common junction 2, by suitable means, which in the drawings are indicated generally by the single lead 5. The generator 6 is arranged in the system with its positive or power take-off side connected to the common junction means 2, through a voltage regulator 7, and a reverse-flow cut-out switch 8 in the usual manner, and it will be understood that the battery, the generator and the several load componenets of the system are connected to a suitable common ground, which in the case of an automobile would be the vehicle frame, indicated generally in the drawings by the numeral 9. Also, as shown in the drawings, a starter 10 is connected, through a starter relay 11, with the positive lead 12 running from the battery to the common junction means 2; and an ignition switch 13 is connected in the ignition system lead 3 for on and off ignition control.

In the form shown in Fig. 1, the improved battery current leak indicator comprises an electromagnetically actuated switch means, indicated generally at 14, operable to open and close a circuit between the battery 1 and an electrically energized signal means 15, which may be a signal light. The electromagnetic switch includes a switch member 16 movable between two positions to engage with and disengage from the stationary contact 17, which leads to the signal device, and the switch member 16 is suitably connected to the battery 1, as by means of a branch lead 18 from the positive line 12 running between the battery and the common junction means 2. The switch member 16 is normally urged toward the open circuit or disengaged position by means of a spring 19, having one end attached to a fixed support and the other end attached to the switch member, and an adjustable stop means, such as a screw 20, is suitably mounted for engaging the switch member 16 to limit its movement toward open position and for adjusting the distance through which the switch member must move to engage the contact 17.

As shown, the electromagnetic element for actuating the switch member 16 to circuit closing position, comprises an electromagnet having an operating coil 21, connected into the battery lead 12, by coil leads 22 and 23, so as to be in series between the battery and the common junction means 2, and an armature 24, which is mounted on or attached to the switch member 16 and disposed for actuation by the magnetic influence of the operating coil 21. In the form shown the electromagnetic means is an electromagnet having an iron core 25 about which the operating coil 21 is wound, and one end of the core 25 is disposed adjacent the armature 24 so as to attract the same and move the switch member 16 to circuit closing position whenever the coil 21 is energized. Thus upon flow of the current from the battery 1 to the common junction means 2, the operating coil 21 is energized and the switch member 16 is actuated to engage the contact 17 and close the circuit from the battery through the connection 18 to the signal means 15.

In the arrangement shown in Fig. 1, a separate means is provided to interrupt the circuit to the signal 15, whenever the generator 6 is operating at sufficient speed to supply enough current to carry any of the several load components that may be in operation. In the form shown this circuit interrupting means comprises a second electromagnetic device in the form of an electromagnet comprising a core 26 and an operating coil 27, mounted to act upon the armature 24 in opposition to the electromagnet 21—25, and the coil 27 is connected between the power supply line of the generator and the common ground 9, on the generator side of the reverse cut-out switch 8. Thus, whenever the power supplied by the generator 6 is equal to or greater than the power required to carry any operating load components connected to the common junction 2, the electromagnet 26—27 will overpower the electromagnet 21—25 and cause the switch member 16 to disengage from the contact 17 and move to its signal circuit opening position.

The reverse flow cut-out switch 8 is a device which normally opens the power supply connection between the generator 6 and the common junction means 2, whenever the generator is not operating, so as to prevent a current drain from the battery through the generator. The switch 8, however, automatically closes when the generator is operating and whenever the generator speed is sufficient to carry the load on the electrical system its power output will neutralize the battery load and energize the signal cut-out coil 27 sufficiently to overpower the coil 21 and move the signal circuit switch member 16 to open position.

At any time, however, that the system load is greater than the amount of power supplied by the generator 6, the signal operating coil 21 will dominate the signal cut-out coil 27 and cause the switch member 16 to move to circuit closing position so as to energize the signal means 15, thereby giving immediate indication of a battery drain.

The sensitivity of the armature 24 to the actuating influence of the operating coil 21, for operation of the switch member 16, is controlled by adjustment of the screw 20 which determines the gap between the core 25 and the armature, and hence the operation of the switch member 16 can be regulated to close the signal circuit upon substantially any amount of current drain from the battery. By such adjustment of the core-armature gap the signal means switch member can be made to operate upon substantially any predetermined amount of battery drain, for example, one-quarter ampere or less, so as to indicate current leak through the electrical system regardless of how it might be caused.

In the arrangement of the invention shown in Fig. 2, the electromagnetic cut-out means is omitted and instead the signal device 15 is connected to the battery circuit by means of a single-pole double-throw ignition switch 28, which, in its "off" position with respect to the ignition circuit, is arranged to close the circuit to the signal means 15. The signal means circuit is completed to ground through the switch member 16, which in turn is operated by the electromagnetic means 29 connected in series between the battery 1 and the common junction means 2. In this case the signal means 15 will be operable only when the ignition circuit is "off" and the signal means circuit will be interrupted or broken whenever the ignition switch 28 is in "on" position for energizing the ignition circuit. In this arrangement electromagnetic means 29 is provided with a copper jacket 30 to minimize the effect of current pulsations caused by operation of the generator which might result in chattering of the switch member 16 when the engine is operating.

The arrangement of the invention as shown in Fig. 3 is substantially the same as that shown in Fig. 1 except that the cut-out coil 27 is connected into the system on the engine side of the ignition switch 13, opposite its connection with the common junction means 2. The operation of this arrangement is substantially the same as that of Fig. 1 and the signal will indicate a battery drain whether or not the engine is operating.

An example of electromagnetically actuated switch structure, that may be employed for the circuit arrangements shown in Figs. 1 and 3, is illustrated in Figs. 4 and 5. In the form shown, the switch arm or contacting member 16 is in common with the armature 24 which in turn is pivotally mounted on a support 31 located substantially midway between the armature ends. The operating coil 21 and the cut-out or hold-out coil 27 are mounted on opposite sides of the support 31, and face the same side of the armature 24, so as to be in opposition to each other in their action on the armature. The center support 31 and the coils 21 and 27 are all mounted on a frame member 32, and the frame member 32 is in turn mounted on an insulated mounting means 33. End members 34 and 35, extending parallel with the center support 31, are provided on the frame 32, and each of the end members is provided with an arm 36 and 37, respectively, which overhangs the respective ends of the armature 24 to hold it in place and limit its pivotal movement. The spring means 19 and the adjusting screw 20 are connected between the frame member and the armature 24 on the side of the center support 31 nearest the holdout coil 27. The leads from the coils 21 and 27, and the lead from the contact 17, are all brought to a terminal board 38 attached to the insulated mounting means 33 and each of the leads is connected to a respective terminal 39.

In this construction the armature 24, which is in common with the switch arm or contact means 16, is connected to the battery by grounding the battery lead 22 of the coil 21 to the frame 32, as at 40, where the lead 22 is soldered to the frame 32; and in operation whenever the coil 21 is energized the armature 24 is pivoted on the support member 31, through the electromagnetic action of the coil 21, and against the action of the spring 19, so as to engage the contact 17 leading to the signal means. Whenever the coil 27 is sufficiently energized, however, its electromagnetic action, together with the action of the spring 19, will overpower the action of the coil 21 and tip the armature in the opposite direction so as to break the circuit through the contact 17 to the signal means. Also, when there is no flow of current through either of the coils 21 or 27, the spring 19 will tip the armature on its fulcrum 31 so as to hold the switching elements 16 and 17 in open circuit position. Adjustment of the tension on the spring 19 by the screw means 20 will determine the sensitivity of the armature 24 to the influence of the operating coil 21.

The main advantages of this invention reside in the simpicitly of the signal actuating means whereby the device can be readily applied to substantially any battery powered electrical system, and particularly to such systems which includes an independently driven generator for carrying the electrical load of the system whenever the generator is in operation; and in the fact that the device will provide an indication of substantially any current drain from the battery, particularly when the generator is not in operation or when the generator is operating at too slow a speed to produce sufficient power to carry the system load.

Other advantages of this invention reside in the fact that the signal means may be extremely sensitive and can therefore obviate the need for an ammeter as an indicator of whether or not there is any discharge from the battery; and in the fact that the signal operating device may be produced at a low cost and safely installed by relatively unskilled persons.

Although several embodiments of this invention have been herein shown and described, it will be understood that details of the system arrangements and the switching means construction shown may be altered or omitted without departing from the spirit of this invention as defined by the following claims.

I claim:

1. In a battery powered electric system including a battery, a plurality of load components, a generator, and a junction means for connecting said load components and generator in circuit with said battery, a current leak indicator comprising an electrically energized signal means having circuit connection with said battery, a switch member movable between two positions to open and close the circuit between said signal means and battery, an electromagnetic means operably associated with said switch member for moving the same to circuit closing position, said electromagnetic means having an operating coil connected in series between said battery and said junction means, means normally urging said switch member toward open circuit position, and means actuated by the current output of said generator for moving said switch member to open position against the influence of said electromagnetic means.

2. In a battery powdered electric system including a battery, a plurality of load components, a generator, and a junction means for connecting said load components and generator in circuit with said battery, a current leak indicator comprising electrically energized signal means having circuit connection with said battery, a switch member movable between two positions to open and close the circuit between said signal means and battery, an electromagnetic means operably associated with said switch member for moving the same to circuit closing position, said electromagnetic means having an operating coil connected in series between said battery and said junction means, means normally urging said switch member toward open circuit position and a second electromagnetic means operatively associated with said switch member for moving said switch member to open position against the influence of the first named electromagnetic means, said second electromagnetic means having an operating coil connected for energization by the generator current output.

3. In a battery powered electric system including a battery, a plurality of load components, a generator, a junction means for connecting said load components and generator in circuit with said battery, a normally open switch between said junction means and said generator, and a second normally open switch between said junction means and one of the load components, a current leak indicator comprising an electrically energized signal means having circuit connection with said battery, a switch member movable between two positions to open and close the circuit between said signal means and battery, an electromagnetic means operably associated with said switch member for moving the same to circuit closing position, said electromagnetic means having an operating coil connected in series between said battery and said junction means, means normally urging said switch member toward open circuit position, and a second electromagnetic means operatively associated with said switch member for moving the same to open position against the influence of the first named electromagnetic means said second electromagnetic means having an operating coil connected to the system on the side of one said normally open switches opposite said junction means.

4. In a battery powered electric system including a battery, a plurality of load components, a generator, a junction means for connecting said load components and generator in circuit with said battery, a normally open switch between said junction means and said generator, and a second normally open switch between said junction means and one of the load components, a current leak indicator comprising an electrically energized signal means having circuit connection with said battery, a switch member movable between two positions to open and close the circuit between said signal means and battery, an electromagnetic means operably associated with said switch member for moving the same to circuit closing position, said electromagnetic means having an operating coil connected in series between said battery and said junction means, means normally urging said switch member toward open circuit position, and a second electromagnetic means operatively associated with said switch member for moving the same to open position against the influence of the first named electromagnetic means, said second electromagnetic means having an operating coil connected to the system between said generator and the first named normally open switch.

5. In a battery powered electric system including a battery, a plurality of load components, a generator, a junction means for connecting said load components and generator in circuit with said battery, a normally open switch between said junction means and said generator, and a second normally open switch between said junction means and one of the load components, a current leak indicator comprising an electrically energized signal means having circuit connection with said battery, a switch member movable between two positions to open and close the circuit between said signal means and battery, an electromagnetic means operably associated with said switch member for moving the same to circuit closing position, said electromagnetic means having an operating coil connected in series between said battery and said junction means, means normally urging said switch member toward open circuit position, and a second electromagnetic means operatively associated with said switch member for moving the same to open position against the influence of the first named electromagnetic means, said second electromagnetic means having an operating coil connected to the system between said second normally open switch and the load component to which it leads.

6. A current leak indicator comprising an electromagnet having an operating coil connected in series between an electric power source and an electrical load system energized thereby, an armature pivotally mounted for movement between two positions, means normally urging said armature toward one of said positions, a second source adapted to actuate said electromagnetic means, and means operated by said armature for indicating electromagnetic actuation of said armature to said other position, said first named electromagnetic means being adapted to actuate said armature to said second position whenever the power from said first named power source exceeds the power from said second named power source by a predetermined amount.

7. A current leak indicator comprising a switch having a contact means movable between two positions, a signal means adapted to be electrically energized when said contact means is disposed at one of said two positions, means for normally urging said contact means to the other said two positions, a first electromagnetic means and power source associated therewith, said electromagnetic means having an operating coil and leads therefrom for series connection of said coil between said power source and a junction means having common connection with said junction means, a second electromagnetic means and power source therefor having an operating coil and leads therefrom for connecting said coil for simultaneous parallel operation with one of said electrical devices connected to said junction means when said switch is in said one position, said first electromagnetic means being adapted to move said contact means to said other position when the power drawn therefrom exceeds the power drawn from said second power source by a predetermined amount.

8. A current leak indicator comprising a switch having a contact means movable between two positions, a signal means, means for normally urging said contact to one position, a first electromagnetic means and power source therefor, said first electromagnetic means having an operating coil and leads therefrom for series connection of said coil between said power source and a load connecting junction means, a second electromagnetic means and power source therefor, said second electromagnetic means having an operating coil and leads therefrom for connecting said coil for simultaneous parallel operation with a load having power drawing connections with said junction means, said first named electromagnetic means being adapted to move said contact to said other position whereby to energize said signal means when the power from said first power source exceeds the power from said second power source by predetermined amount.

9. A current leak indicator operating device comprising a switch having a contact member movable between two positions for opening and closing an electric circuit, means normally urging said contact member to an open position, an electromagnet and power source therefor mounted adjacent said contact member, a second electromagnet and power source therefor mounted adjacent said contact member and leads from each of said electromagnets for connecting them to respective operating circuits, said first electromagnet being adapted to move said contact member to a closed position when the power for said electromagnet exceeds the power for said second electromagnet by a predetermined amount.

10. A current leak indicator operating device comprising a switch having a contact movable between two positions for opening and closing an electric circuit, adjustable tension means normally urging said contact member to open position, an electromagnet and power source therefor mounted adjacent said contact member, a second electromagnet and power source therefor mounted adjacent said contact member and leads from each of said electromagnets for connecting them to respective operating circuits, said first electromagnet being adapted to move said contact member to closed position when the power from said first power source exceeds the power from said second power source by a predetermined amount as controlled by said adjustable tension means.

References Cited in the file of this patent

UNITED STATES PATENTS

| | | |
|---|---|---|
| 1,726,994 | Murray | Sept. 3, 1929 |
| 2,101,407 | Morland | Dec. 7, 1937 |
| 2,349,740 | McCollum | May 23, 1944 |
| 2,439,634 | Robey | Apr. 13, 1948 |
| 2,507,398 | Castro | May 9, 1950 |
| 2,581,338 | La Roza | Jan. 8, 1952 |